Patented Mar. 25, 1952

2,590,403

UNITED STATES PATENT OFFICE 2,590,403

PREPARATION OF AMMONIUM PENICILLIN

Knud Hallas-Møller, Holte, and Karl Petersen, Copenhagen, Denmark, assignors to Novo Terapeutisk Laboratorium A/S, Copenhagen, Denmark, a firm No Drawing. Application June 17, 1948, Serial No. 33,666

11 Claims. (Cl. 260—239.1)

This invention relates to fractionation of penicillin salts and has for its object to provide a novel and improved process for this purpose.

Another object of the invention is to produce highly active penicillin preparations rich in penicillin G.

Still another object of the invention is to separate penicillin G from penicillin F and K.

Various other objects and advantages will be apparent from the following description explaining in detail wherein the novel and inventive features of our process consist and how our process is carried into practical effect.

It is known that cultures of certain moulds of the type of Penicillium notatum and Penicillium chrysogenum contain a principle able to suppress the growth of pathogenic organisms. This principle is generally known as penicillin and the isolation thereof from the culture media with subsequent rectification and chemical investigations has shown that the penicillin is not a single chemical substance. At the present time, four different chemical substances have been identified, viz. penicillin F, G, X and K.

In recovering these penicillins from the culture media in which they are formed and in rectifying the crude penicillins thus obtained use has been made of their common chemical and physical properties. The free penicillins are organic acids insoluble in water and soluble in a plurality of organic solvents. They are able to form salts which are soluble in water, but insoluble in organic solvents. Consequently, the penicillins contained as salts in the culture media may be recovered by acidification and extraction with organic solvents followed by neutralization. This procedure may be repeated to improve the purity of the penicillin preparations. In some cases purification is also assisted by treating the aqueous penicillin salt solutions with charcoal. The final aqueous solution of the penicillin salts, usually the sodium salts, is then freeze dried. Such products generally show a potency of about 500–1000 units per milligram, but contain still a number of impurities objectionable to the therapeutic use of the products.

These impurities may be partly removed by causing the penicillin salts to precipitate in the form of ammonium salts of crystals. The following procedure has been proposed:

The aqueous solution of the penicillin salts is acidified and extracted with chloroform. The separated aqueous solution is again extracted with chloroform and the combined chloroform extractions are dried and concentrated in vacuo. Dry benzene is added to the chloroform solution and dry ammonia gas is passed in for some minutes causing precipitation of the ammonium salt of the penicillins in the shape of crystals. These crystals are then washed with petroleum ether, separated and dried. The crystals are slightly colored.

Information has also been given that it should be possible to produce the sodium salts in a similar way by using a sodium salt of carbonic acid, preferably sodium bicarbonate, instead of ammonia.

The above description is only giving the principal lines of the procedures hitherto followed. Many variations in the details have been used and specific purification steps have been inserted to remove the colored impurities. Nevertheless, even if the procedure has been modified the principal lines indicated above have been followed. In this way it has been possible to produce penicillin salts showing a potency of about 1500–1600 units per milligram.

The reason for producing the crystalline penicillin salts is not only their increased bacteriostatic activity and improved therapeutic qualities for clinical purposes, but also the increased physical stability of the crystalline salts in comparison with amorphous products obtained by freeze-drying. The increased stability is an important factor in the production of penicillin preparations on a commercial scale.

The result of these purifying processes has been a mixture of the salts of the various penicillins. If organic solvents such as chloroform have been used for the extraction of the free penicillins the mixture of the crystalline salts will not contain the salt of penicillin X as the latter is not soluble in solvents as chloroform. Therefore, usually the mixture consists of the salts of penicillin F, G and K.

In the recent days all investigators have aimed at a penicillin preparation rich in penicillin G as this specific penicillin is the most active one for many purposes. Although the contents of penicillin G of the mixture of salts may be increased by using certain culture media, specific strains of moulds, and favourable growing conditions the crystalline salt mixture obtained will always contain appreciable amounts of penicillin F and K undesired for many purposes.

The present invention is based upon the observation that the solubility of the alkali metal salts of the penicillins, particularly of the sodium salts thereof, differs materially in water-miscible organic solvents. While the sodium and potassium salts of the penicillins are all soluble in the said solvents in the presence of a certain amount of water the solubility of the said salts of penicillin G will decrease rapidly when the water content is brought down under a certain level.

This may be illustrated with reference to the use of acetone as the water-miscible organic solvent. The sodium salts of penicillin F, G and K are all soluble in acetone containing above 10% of water. If the acetone contains 9% of water a few crystals will be formed after about 24 hours, and with decreasing content of water the amount of crystals precipitated will increase. Below 5% of water will give a very good crop of crystals, and it has been found that the crystals precipitated mainly consist of the sodium salt of penicillin G. Similar, but not so favourable results may be obtained with the potassium salts of the penicillins.

Naturally, the solubility depends on the purity of the alkali metal salts, and the best results are obtained with the purest salts. Taking the potency of the alkali salt preparations as a measure of their purity, preparations showing an activity below about 500 units per milligram will not give results suitable for practical purposes. However, as the results are improved with increasing purity of the salt mixture it is preferred to effect a more intensive purification of the salt mixture to obtain activities far above 500 units per milligram before subjecting the mixture to the fractionating crystallization of the invention. In the preferred embodiment of the invention use is made of a mixture of alkali metal salts of the penicillins showing an activity above 1000 units per milligram, preferably about 1600 to 1700 units per milligram.

One fractionation by crystallization in the water-miscible organic solvent will usually result in crystals of the alkali salt of penicillin G containing a certain amount of the alkali salts of the other penicillins which have been entrained during the crystallization. These latter salts may, however, be removed by repeated fractionation. In the case of the sodium salts one fractionation will often suffice for practical purposes when using a salt mixture showing a potency of about 1700 units per milligram of dry substance and when using acetone as fractionating agent. In the case of the potassium salts usually two or more fractionation steps will be required, and even then the results are not so successful.

As a suitable water-miscible organic solvent for the fractionating purpose of the invention acetone has been mentioned but experiments have shown that also other aliphatic ketones such as butanone may be used. Although aliphatic ketones and preferably acetone are preferred at present the invention is not restricted to the use of such ketones. Every water-miscible ketone acting as a solvent for the alkali salts of the penicillins in the presence of a certain amount of water and precipitating the alkali salt of penicillin G by appropriate decrease of the water content may be used to effect the fractionation. Other ketones may be located without inventive power as tests common to those skilled in the art will show whether a certain ketone is in possession of the desired properties.

Among other water-miscible organic solvents useful for the purpose of the invention aliphatic alcohols should be mentioned. Propanol and butanol are preferred examples of suitable aliphatic alcohols showing a fractionating ability just as pronounced as that of the ketones. On the other hand we have found that ethyl alcohol will under normal conditions not give satisfactory results.

As mentioned above the results of the invention depend to a great extent on the purity of the mixture of penicillin salts used as starting material. Therefore, it is also an object of the invention to provide the desired purity of the salt mixture in a simple and effective way securing high yields of crystals showing a high degree of purity.

Various fermentation methods for the production of crude solutions of the penicillins have been described in the literature available and by careful selection of the mould strain, use of an appropriate culture medium, and favourable operating conditions titres containing up to 800 units per millilitre are obtainable.

After fermentation and filtration to remove the mycelial mass the filtrated penicillin solution is subjected to preliminary concentration and purification in the usual way by alternate transference of the penicillins to an organic solvent and to a dilute aqueous alkaline solution or suspension, or use is made of an absorbent from which the penicillins are subsequently extracted. Combinations of both these concentrating and purifying methods may also be used.

In this way a crude aqueous solution of the salts of the penicillins is obtainable which contains in average about 1000 units per milligram of solids, and penicillin G will constitute 60 to 90% of the active ingredients.

Such a solution is the preferred starting material for the production of the crystalline penicillin salt mixture to be fractionated according to the invention.

In producing the crystalline salt mixture we make use of the principal lines of the known process of making the crystalline ammonium salts, but our procedure differs therefrom by carrying out the precipitation of the ammonium salts in a water-miscible organic solvent. For this purpose water-miscible ketones are particularly useful and among these ketones acetone has been found to give the most successful results. Acetone gives crystals of high purity and the yields thereof are also increased in comparison with those obtained by the methods proposed by other investigators.

The crude and cooled penicillin solution is first shaken with an organic solvent, such as chloroform, under simultaneous acidification to liberate the penicillin acids, preferably to pH about 2. The chloroform fraction now containing all the penicillins except any penicillin X present is then filtrated through a water absorbent to remove any emulsified water and subsequently mixed with an anhydrous water-miscible organic solvent, preferably in an amount of one and a half times its volume. Gaseous ammonia is passed through the solution while agitating the same until pH has been increased to about 7 to 9 (measured with a glass electrode). The preferred pH value within the range indicated depends on the amount and nature of the impurities in the crude solution. When using relatively impure solutions adjustment of pH to about 7.5 is preferred because this pH results in crystals of higher purity than when using a higher pH. Already preliminary neutralization causes the free penicillin acids to crystallize as the ammonium salts. The salts are obtained in yields ranging from 80% to 100%.

The following example illustrates in detail a preferred embodiment of this crystallization step.

*Example 1*

1000 millilitres of crude solution of penicillin salts showing a potency of 130,000 units per millilitre and a purity of about 1000 units per milligram of solids and having a pH of 6.5 is shaken with 500 millilitres of chloroform under addition of 2 normal sulfuric acid to pH 2. The chloroform fraction is separated, dried with 50 to 100 grams of anhydrous sodium sulfate and filtrated. 825 millilitres of acetone is added to the filtrated solution and gaseous ammonia is passed through the solution while agitating until pH 7.3. The crystallized ammonium salts of the penicillins are separated on a suction filter, washed with acetone and ether and dried.

The yield is 73 grams corresponding to 93.7%, and the crystals show a potency of about 1600 units per milligram. Penicillin G constitutes 80% of the active ingredients.

However, these crystals are more or less miscolored. They are generally slightly yellow and the mutual proportion of penicillin G, F and K is that of the original crude solution of the penicillins. The crystallization has caused no fractionation of the penicillin modifications. On the other hand, the crystals contain no penicillin X as chloroform has been used for extracting the penicillins from the crude solution.

Although the crystals of the ammonium salts thus obtained may be used for our fractionating purpose we prefer to insert a recrystallization step prior to our fractionating step to remove the colored matters and other impurities still present.

Also for this purpose we have found that water-miscible organic solvents and particularly acetone and other water-miscible ketones as crystallizing agents produce results superior to those hitherto obtained with other organic solvents immiscible with water.

The crystals of the ammonium salts are dissolved in a mixture of a water-miscible organic solvent and water, preferably containing one part by weight of the organic solvent and half as much water, while subjecting the solution to a slight heating. Then an additional amount of the water-miscible organic solvent is added to produce a concentration thereof of about 90%. This will cause recrystallization and after cooling below zero the colorless ammonia salt crystals are precipitated. After evaporation of the organic solvent the mother liquid may be worked up to pure crystals by the same recrystallization process.

The following example will illustrate in detail a preferred embodiment of this recrystallization step.

*Example 2*

73 grams of the crystalline ammonium salts of the penicillins produced according to Example 1 are dissolved in 110 millilitres of acetone and 36.5 millilitres of water while heating the solution to about 50° C. 220 millilitres of acetone are added to the solution, and the ammonium salts immediately begin to crystallize in large needles. The crystallization mixture solidifies to a solid crystal cake which is kept at +10° C. for 24 hours. The crystals are separated on a suction filter and washed first with 50 millilitres of acetone (95%) at +10° C., then with 200 millilitres of acetone and finally with ether and dried.

The yield is 54.6 grams corresponding to 74.8% and the colorless crystals show a potency of 1700 units per milligram. The penicillin G constitutes 84% of the active ingredients.

The acetone is evaporated from the mother liquid formed by separation of the recrystallized crystals and the residue obtained is again subjected to recrystallization as described above. This recrystallization gives an additional crop of crystals amounting to about 7 grams.

These pure ammonium salt crystals are now converted into a solution of the corresponding salts of an alkali metal, preferably the corresponding sodium salts, which are then subjected to fractionation by crystallization.

This conversion is effected by first liberating the free penicillin acids and taking up the free acids in an organic solvent and then reacting the free acids with a solution or suspension of an alkali metal hydroxide or an alkali metal salt of an acid weaker than the penicillin acids. We prefer to use an alkali metal carbonate or bicarbonate, preferably sodium carbonate or bicarbonate, as the liberated carbonic acid will escape as carbon dioxide.

During the conversion of the ammonium salts into the alkali salts we endeavour to use the smallest possible amounts of solvents, including water, so that the resultant solution of the alkali metal salts will be as concentrated as possible. Preferably saturated solutions are produced.

The following examples will illustrate this conversion step.

*Example 3*

54.6 grams of the ammonium penicillin salts of Example 2 are dissolved in 110 millilitres of water and cooled to 5° C. The resultant solution is shaken with 110 millilitres of peroxide-free ether under addition of 90 millilitres of 2 normal sulfuric acid. The ether fraction is separated and dried with 25 grams of anhydrous sodium sulfate. After filtration the clear solution is mixed with a suspension of 13.6 grams of sodium bicarbonate in 16.4 millilitres of water. The ether is evaporated by slight heating and agitation. During the heating also most of the liberated carbon dioxide escapes. The remainder of the carbon dioxide is removed in vacuum.

In this way a saturated aqueous solution of the sodium salts of the penicillins is obtained.

In this solution penicillin G constitutes about 84% of the active ingredients whereas the remaining 16% are penicillins F and K.

*Example 4*

10 grams of ammonium penicillin salts recrystallized as described in Example 2 and showing a potency of 1700 units per milligram are dissolved in 20 millilitres of water. After addition of 20 millilitres of peroxide-free ether the solution is cooled to 5° C. and 17 millilitres of 2 normal sulfuric acid are added while shaking. The ether fraction is separated and dried with anhydrous sodium sulfate. After filtration and washing with 10 millilitres of ether the clear solution is mixed with a suspension of 2.52 grams of sodium bicarbonate in 3 millilitres of water. The ether is evaporated by slight heating and agitation. The remaining carbon dioxide is removed in vacuum.

In the resultant saturated aqueous solution of the sodium salts of the penicillins penicillin G constitutes about 72% of the active ingredients while the remaining 28% are penicillins F and K.

We have now found that the penicillin G salt contained in the saturated aqueous solutions of the sodium salts of the penicillins may be separated from the salts of penicillins F and K when adding to the solution a water-miscible organic solvent in an amount sufficient to produce a certain high concentration thereof. Under such conditions the salt of penicillin G will crystallize while the salts of the other penicillins will remain in solution.

The exact concentration of the water-miscible organic solvent to cause fractionation will depend on the nature of solvent selected and may be established by experiments. In the foregoing description the figures are given in respect of acetone. If acetone is added to the aqueous solution of the sodium salts of the penicillins to produce a concentration thereof of about 97% the crystals precipitated will contain 98% of penicillin G which may be considered a sufficient fractionation for practical purposes. However, by repeated fractionations crystals may be obtained containing about 100% of penicillin G.

The salts of the other penicillins will remain in solution and can be recovered by precipitation with an organic solvent not miscible with water, such as amyl acetate.

The following examples will illustrate in detail this fractionation step.

*Example 5*

To the saturated solution of the sodium salts of the penicillins produced according to Example 3 there are added 100 millilitres of anhydrous acetone and the solution is sterilized by Seitz filtration. Under continued aseptic conditions 2170 millilitres of anhydrous acetone are added and the mixture is allowed to stand for 24 hours. The precipitated crystals are separated on a filter by suction, washed with anhydrous acetone and dried.

The yield amounts to 44 grams corresponding to 80.5% and the crystals show a potency of about 1650 units per milligram and contain about 98% of penicillin G.

The mother liquid is evaporated to form a saturated aqueous penicillin solution, and 300 millilitres of acetone and 1200 millilitres of amyl acetate are added thereto, thereby causing crystallization. The crystals are separated by filtration and washed first with a mixture of acetone and amyl acetate and then with ether and finally dried. The yield amounts to 8.3 grams showing a content of penicillins F and K of about 85%, while the remaining 15% are penicillin G.

By repeating the fractionation crystals are obtainable which contain penicillins F and K and no appreciable amounts of penicillin G.

*Example 6*

To the saturated solution of the sodium salts of the penicillins produced according to Example 4 there are added 25 millilitres of butanone while agitating. After filtration further 275 millilitres of butanone are added and the mixture is allowed to stand 24 hours. The precipitated crystals are separated on a filter by suction and washed with butanone and dried.

The yield amounts to 4.0 grams. The crystals show an activity of about 1650 units per milligram and contain 93% of penicillin G.

The sodium salts of the penicillins F and K may be recovered from the mother liquid as described in Example 5.

*Example 7*

To the saturated solution of the sodium salts of the penicillins produced according to Example 4 there are added 25 millilitres of n-butanol while agitating. After filtration further 275 millilitres of n-butanol are added and the mixture is allowed to stand 24 hours. The crystals formed are separated on a filter by suction and washed with n-butanol and dried.

The yield amounts to 4.4 grams. The crystals show an activity of about 1650 units per milligram and contain 90% of penicillin G.

The sodium salts of the penicillins F and K may be recovered from the mother liquid as described in Example 5.

Saturated aqueous solutions of the corresponding potassium salts have also been subjected to the fractionating step with the use of acetone as fractionating solvent, but the results are not so successful as those obtained with the sodium salts. If the ammonium salt crystals used for the production of the saturated aqueous solution of the potassium salts show a content of penicillin G of about 54% one fractionation will increase the content of penicillin G to 62% and a second fractionation will bring the content up to 77%. However, similar results as those obtained with the sodium salts may be obtained by repeating the fractionation several times.

The above examples are given to illustrate the invention and are not intended to limit the scope thereof.

What we claim is:

1. In a process for producing ammonium salts of penicillins, the steps which comprise, adding a water-miscible aliphatic ketone to a solution of free penicillin acids in a water-immiscible solvent showing a potency of above 500 units per milligram of dry substance, passing gaseous ammonia through the solution until a pH value of 5 to 9 is obtained, and separating the precipitated ammonium salt crystals.

2. A process as defined in claim 1 wherein the water-miscible aliphatic ketone is acetone.

3. A process as defined in claim 1 wherein the water-miscible aliphatic ketone is butanone.

4. A process as defined in claim 1 wherein the solution of the free penicillin acids shows a potency of above 1000 units per milligram of dry substance.

5. In a process of producing ammonium salts of penicillins as claimed in claim 1 the further step of recrystallizing the crystalline ammonium salts by adding thereto a water-miscible organic solvent inert toward said ammonium salts in the presence of sufficient water to bring the crystals into solution, adding additional amounts of the said solvent to the said solution to increase the concentration thereof sufficient to cause precipitation of colorless crystals of the ammonium salts.

6. A process as claimed in claim 5, in which the water-miscible organic solvent is a water-miscible aliphatic ketone.

7. A process as claimed in claim 5, in which the water-miscible organic solvent is a water-miscible aliphatic alcohol.

8. A process as claimed in claim 5, in which the water-miscible organic solvent is acetone.

9. A process as claimed in claim 5, in which the water-miscible organic solvent is butanol.

10. In a process of producing ammonium salts of penicillins as claimed in claim 1, the further step of recrystallizing the crystalline ammonium salts by adding thereto acetone in the presence of sufficient water to bring the crystals into solution, adding additional amounts of acetone to the solution to produce a concentration thereof above 90%, thereby causing precipitation of colorless crystals of the ammonium salts.

11. In a process of producing ammonium salts of penicillin as claimed in claim 1, the further step of recrystallizing the crystalline ammonium salts by adding thereto butanol in the presence of sufficient water to bring the crystals into solution, adding additional amounts of butanol to produce a concentration thereof above 90%, thereby causing precipitation of colorless crystals of the ammonium salts.

KNUD HALLAS-MØLLER.
KARL PETERSEN.

REFERENCES CITED

The following references are of record in the file of this patent:

UNITED STATES PATENTS

| Number | Name | Date |
|---|---|---|
| 2,461,949 | Wintersteiner et al. | Feb. 15, 1949 |
| 2,496,848 | Bernhart | Feb. 7, 1950 |
| 2,538,735 | Senkus | Jan. 16, 1951 |

OTHER REFERENCES

Meyer et al.: "Science," vol. 96, pp. 20, 21, July 3, 1942.

Squibb Report, CMR–S–XVII, (extract of Report S–IIIa, Nov. 1, 1943), pp. 3–7.

Heyden Report, CMR–H–II, pp. 1 and 2, May 22, 1944.

Heyden Report, CMR–H–4, pp. 1 and 2, June 15, 1944.

Cutter Report, CMR–Cu–4, p. 8, Feb. 1, 1945.

"The Chemistry of Penicillin," Princeton University Press, (1949), pp. 89, 100, 101 and 1056 (particularly abstract of Merck "Report for Oct. 1943," p. 4).

Cleary: "Official Gazette" (of the Patent Office) Aug. 1, 1950, p. 256.